United States Patent
Karsch et al.

(10) Patent No.: US 9,132,788 B2
(45) Date of Patent: Sep. 15, 2015

(54) DISPLAY DEVICE IN A MOTOR VEHICLE

(75) Inventors: Hans-Ulrich Karsch, Grub am Forst (DE); Alwin Macht, Ebensfeld (DE); Daniela Stegner, Neustadt (DE); Steffen Roβ, Wettstetten (DE); Sabine Wüst, Ingolstadt (DE); Hans Possler, Wettstetten (DE)

(73) Assignees: Brose Fahrzeugteile GMBH & Co., KG Coburg, Coburg (DE); Audi AG, Neckarsulm (DE)

( * ) Notice: Subject to any disclaimer, the term of this patent is extended or adjusted under 35 U.S.C. 154(b) by 720 days.

(21) Appl. No.: 12/743,062
(22) PCT Filed: Nov. 13, 2008
(86) PCT No.: PCT/EP2008/009611
§ 371 (c)(1),
(2), (4) Date: Dec. 2, 2010
(87) PCT Pub. No.: WO2009/062720
PCT Pub. Date: May 22, 2009

(65) Prior Publication Data
US 2011/0063530 A1 Mar. 17, 2011

(30) Foreign Application Priority Data
Nov. 16, 2007 (DE) .......................... 10 2007 055 246

(51) Int. Cl.
*H04N 13/00* (2006.01)
*B60R 11/02* (2006.01)
(Continued)

(52) U.S. Cl.
CPC ............. *B60R 11/0235* (2013.01); *B60K 35/00* (2013.01); *B60K 37/06* (2013.01);
(Continued)

(58) Field of Classification Search
CPC ............... B60K 2350/1024; B60K 2350/1028; B60K 35/00; B60K 37/06; B60R 11/0235; B60R 11/0258; B60R 2011/0005; B60R 2011/0007; B60R 2011/0082; B60R 2011/0084; B60R 2011/0085; B60R 2011/0092; B60R 2011/0094
USPC .............................. 348/837, E05.128, E5.128
See application file for complete search history.

(56) References Cited

U.S. PATENT DOCUMENTS 5,362,144 A 11/1994 Shioya et al.
6,012,785 A 1/2000 Kawasaki
(Continued)

FOREIGN PATENT DOCUMENTS

DE 19804743 8/1998
DE 19749365 5/1999
(Continued)

OTHER PUBLICATIONS

International Search Report, mailed Apr. 16, 2009 in international application PCT/EP2008/009611, 6 pages.
(Continued)

*Primary Examiner* — Sath V Perungavoor
*Assistant Examiner* — Dakshesh Parikh
(74) *Attorney, Agent, or Firm* — Pauly, DeVries Smith & Deffner, LLC

(57) ABSTRACT

The invention relates to a display device in a motor vehicle, comprising an adjustable screen and adjustment kinematics associated with the screen. The adjustment kinematics comprise an adjustment drive having a drive motor for the screen, the screen being adjustable between a parking position and a functional position by means of the adjustment drive. The adjustment drive has a driver and is drive-coupled to the screen via the driver, a displacement guide being provided and the drive being guided by means of the displacement guide. The invention is characterized in that the adjustment drive and the displacement guide form a pre-assembled structural unit which as such can be coupled to the rest of the adjustment kinematics during final assembly.

11 Claims, 8 Drawing Sheets

(51) Int. Cl.
  *B60K 35/00* (2006.01)
  *B60K 37/06* (2006.01)
  *B60R 11/00* (2006.01)

(52) U.S. Cl.
  CPC . *B60K2350/1024* (2013.01); *B60K 2350/1028* (2013.01); *B60R 11/0258* (2013.01); *B60R 2011/0005* (2013.01); *B60R 2011/0007* (2013.01); *B60R 2011/0082* (2013.01); *B60R 2011/0084* (2013.01); *B60R 2011/0085* (2013.01); *B60R 2011/0092* (2013.01); *B60R 2011/0094* (2013.01)

(56) References Cited

U.S. PATENT DOCUMENTS

| | | | |
|---|---|---|---|
| 6,049,288 | A | 4/2000 | Kawasaki |
| 6,874,279 | B1 * | 4/2005 | Weber et al. .................. 49/352 |
| 2003/0196383 | A1 | 10/2003 | Fenelon |
| 2007/0030647 | A1 * | 2/2007 | Chen et al. .................. 361/687 |
| 2007/0144853 | A1 | 6/2007 | Stern et al. |

FOREIGN PATENT DOCUMENTS

| | | |
|---|---|---|
| DE | 19938690 | 2/2001 |
| DE | 10008887 | 6/2003 |
| DE | 102005023578 | 10/2006 |
| DE | 102005038431 | 2/2007 |
| DE | 102005052031 | 5/2007 |
| DE | 102005062316 | 6/2007 |
| EP | 0438657 | 7/1991 |
| EP | 0551078 | 7/1993 |
| EP | 1800954 | 6/2007 |

OTHER PUBLICATIONS

"Search Report," for DE102007055246.9 related to our file 218.0004USWO, mailed Dec. 13, 2007 (4 pages).

* cited by examiner

DISPLAY DEVICE IN A MOTOR VEHICLE

CROSS-REFERENCE TO RELATED APPLICATIONS

This application is a national stage application under 35 U.S.C. 371 of International patent application Ser. No. PCT/EP2008/009611, entitled "DISPLAY DEVICE IN A MOTOR VEHICLE," filed Nov. 13, 2008, which claims priority from German Patent Application No. 10 2007 055 246.9, filed Nov. 16, 2007. The entire content of each of these applications is incorporated herein by reference.

FIELD OF THE INVENTION

The invention relates to a display device in a motor vehicle and to an adjusting drive system of a display device of this type

BACKGROUND OF THE INVENTION

The display device in question is usually arranged in a dashboard or in the region of a dashboard which is situated in the interior of a motor vehicle. The display device has an adjustable monitor which is usually configured as an LCD display.

Display devices of this type can be used for different purposes. This includes the display of navigation information, of vehicle state information or of audio information. The display device often serves not only for the display, but also for inputting information. For this purpose, there can be provision for additional operating elements to be provided on the display device. In various cases, the display device is also configured as a touchscreen for inputting information.

Furthermore, there is provision in the display device in question for it to be possible for the monitor to be adjusted between a parked position and a functional position. For this purpose, the monitor is assigned an adjusting kinematic means which has all the components which are required to adjust the monitor, in particular a monitor mounting means and an adjusting drive. In the case of a monitor which is situated in the parked position, the monitor is usually arranged lowered into the dashboard and is not visible to the vehicle occupants. In the case of a monitor which is situated in the functional position, the monitor is positioned in such a way that the desired information can be read off comfortably by the vehicle occupants.

The known display device (DE 10 2005 052 031 A1), from which the invention proceeds, has an above-described adjusting drive. The adjusting drive is configured as a rack and pinion drive which transmits a linear adjusting movement to the monitor. The monitor is mounted via a joint arrangement in such a way that a pivoting movement is superimposed on the linear movement.

A disadvantage of the known display device is its structural design which does not permit preassembly of individual assemblies of the display device. The time outlay for the assembly is correspondingly high.

SUMMARY OF THE INVENTION

The invention is based on the problem of configuring and developing the known display device in such a way that its structural design is optimized with regard to the time outlay which is required for the assembly.

The above problem is solved in a display device in accordance with the preamble of claim 1 by the features of the characterizing part of claim 1.

The consideration is essential that the adjusting drive and the displacement guide together form one structural unit which can be preassembled and, as such a unit, can incidentally be coupled to the adjusting kinematic means during final assembly. This allows the adjusting drive together with the displacement guide to be incidentally preassembled separately from the adjusting kinematic means and subsequently to incidentally be inserted into the display device. Parallel assembly steps are therefore possible, which leads to speeding up in the assembly as a whole. Furthermore, it is conceivable to acquire the adjusting drive together with the displacement guide as a preassembled structural unit from an external supplier.

In the preferred refinement in accordance with claim 2, the adjusting drive is configured as a cable drive. This allows, in particular, low noise operation to be achieved. Furthermore, the outlay on maintenance for the display device is at a minimum.

In the preferred refinement in accordance with claim 6, the adjusting drive is configured as a two stage rack and pinion drive. The installation space requirement is only at a minimum with a corresponding design.

It is proposed in accordance with claim 9 to configure the adjusting drive as a spindle drive. This also allows a high degree of smooth running to be achieved. Furthermore, the robustness which is associated with the spindle drive is particularly great.

According to a further teaching in accordance with claim 18, a display device is claimed, in which the adjusting drive is configured as a cable drive, it being possible for the refinement as one unit which can be preassembled to be omitted. Reference may be made to the full scope of the comments with respect to the cable drive.

According to a further teaching in accordance with claim 20 which is likewise given independent significance, a display device is claimed, in which the adjusting drive is configured as a two stage rack and pinion drive, it being possible for the refinement as one unit which can be preassembled to be omitted. Reference may be made to the full scope of the comments with respect to the two stage rack and pinion drive.

According to a further teaching in accordance with claim 22 which is likewise given independent significance, a display device is claimed, in which the adjusting drive is configured as a spindle drive. A refinement as one structural unit can also be omitted here. Reference may be made to the full scope of the comments with respect to the spindle drive.

According to a further teaching in accordance with claim 24 which is likewise given independent significance, an adjusting drive system is claimed with an adjusting drive for adjusting the monitor of a display device in a motor vehicle. In one preferred refinement, an adjusting drive system of this type comprises the components adjusting drive and displacement guide. Reference may be made to the full scope of the comments with respect to the adjusting drive and with respect to the components which are assigned to the adjusting drive, such as the displacement guide.

BRIEF DESCRIPTION OF THE DRAWINGS

In the following text, the invention will be explained in greater detail using a drawing which illustrates merely exemplary embodiments and in which.

DETAILED DESCRIPTION OF THE DRAWINGS

Figure 1:
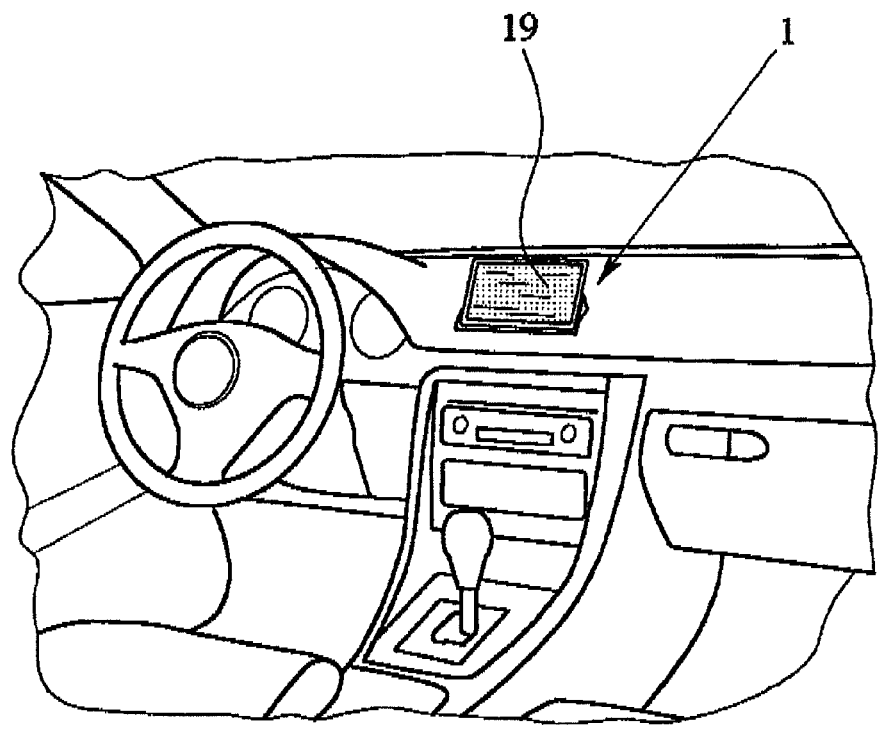
FIG. 1 shows a perspective illustration of the region of the dashboard of a motor vehicle.

The dashboard (shown in FIG. 1) of a motor vehicle is configured with the customary components such as a steering wheel, a gearshift lever, etc. Furthermore, the monitor 1 of a display device is shown. The monitor 1 can be adjusted between a parked position and a functional position which is shown in FIG. 1. An adjusting kinematic means is provided for this purpose.

The adjusting kinematic means comprises all the components which are required for the adjustment of the monitor 1. Part of this is, inter alia, an adjusting drive 2 with a drive motor 3 which is shown in FIGS. 2 to 8 in three preferred embodiments. It can be gathered from the illustration in FIG. 1 that the monitor 1 which is situated in the functional position is positioned in such a way that information can be read off readily by the vehicle occupants. The monitor 1 which is situated in the parked position is lowered into the dashboard and correspondingly not visible. This will be explained further in the following text.

Depending on the application, the monitor 1 can be equipped with operating elements for inputting information. It is also conceivable that the monitor 1 is configured as a touchscreen. In both cases, the monitor 1 serves not only to display information, but also to input information.

Reference may be made in advance to the fact that the adjusting kinematic means of the monitor 1 is provided in all the embodiments shown, in such a way that the monitor 1 can be displaced and at the same time can be pivoted. Here, during the adjustment from the parked position into the functional position, the monitor 1 moves outward under a monitor cover 1a. This will be explained further below.

Furthermore, it is the case in all the embodiments which are shown and to this extent preferred that the adjusting drive 2 has a driver 4 and is coupled in driver terms to the monitor 1 via the driver 4. The driver 4 therefore represents the output of the adjusting drive 2. Numerous variants are conceivable for realizing the driver 4. The only essential factor is that the drive movements of the adjusting drive 2 can be output via the driver 4.

Furthermore, a displacement guide 5 is provided, the driver 4 being guided here by means of the displacement guide 5. For this purpose, the driver 4 is configured as a slide. The displacement guide can be a guide along a straight track or a guide along a bent track. This will be explained further below.

It is essential in all the embodiments which are shown and to this extent preferred that the adjusting drive 2 and the displacement guide 5 together form one structural unit which can be preassembled and can incidentally be connected to the adjusting kinematic means during final assembly. The advantages which are associated with this have been explained in the introductory part of the description.

Figure 2:
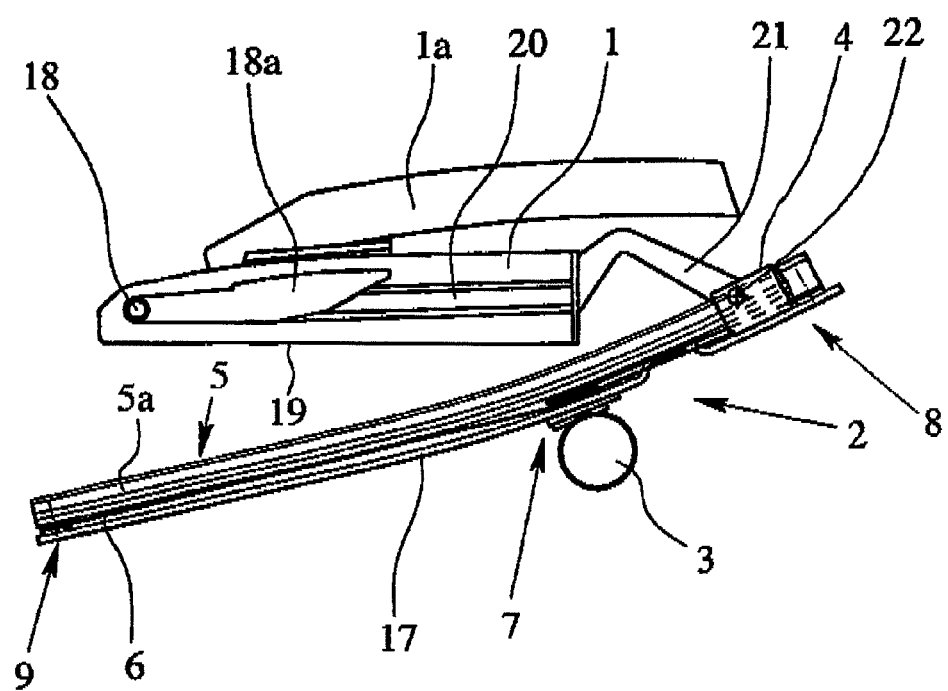
FIG. 2 shows a side view of a first embodiment of a display device according to the proposal in the parked position.
Figure 3:
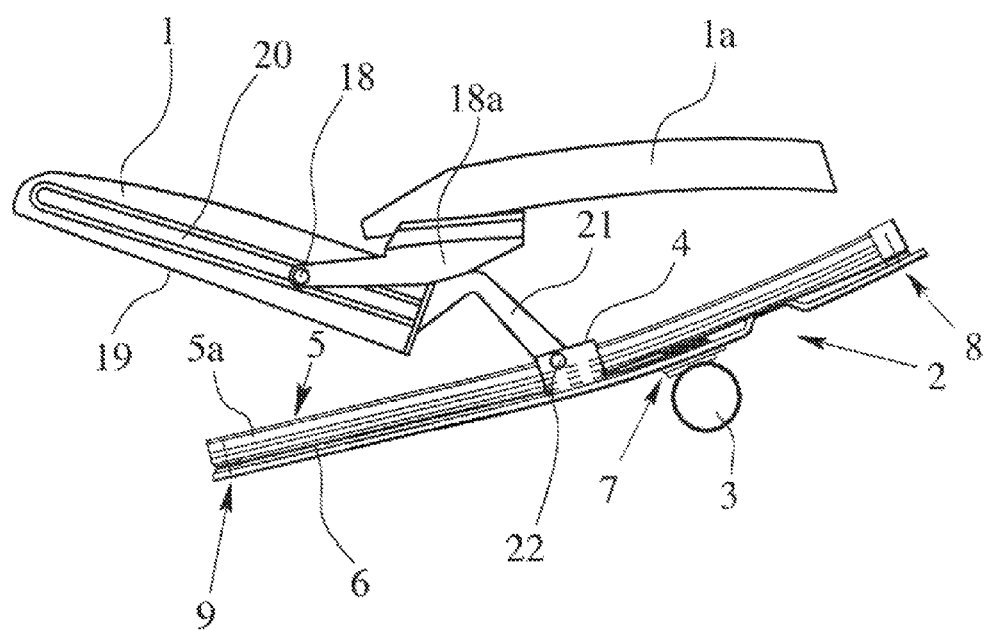
FIG. 3 shows the display device according to FIG. 2 in an intermediate position.
Figure 4:
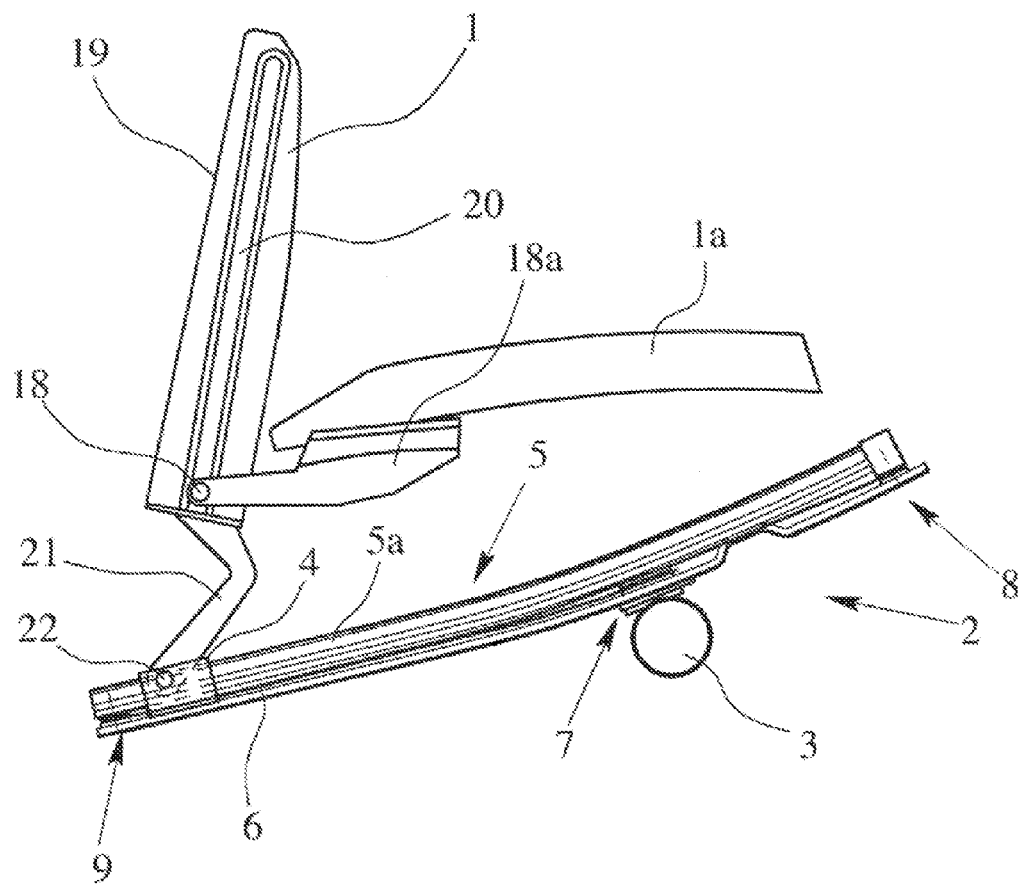
FIG. 4 shows the display device according to FIG. 2 in the functional position.

In the preferred embodiment which is shown in FIGS. 2 to 4, the adjusting drive 2 is configured as a cable drive with a drive cable 6, the drive cable 6 being coupled in drive terms to the monitor 1 via the driver 4. It is the case here, in particular, that the drive motor 3 is coupled in drive terms to the drive cable 6 via a cable drum 7. In the case of a motorized adjustment of the monitor 1, the drive cable 6 is preferably wound onto the cable drum 7 at one end and unwound from the cable drum 7 at the other end.

Here, the drive cable 6 preferably runs over two deflecting means 8, 9 which are spaced apart from one another and are more preferably deflecting rollers 8, 9 or deflecting pins. Here, the drive cable 6 is guided from the cable drum 7 via the two deflecting means 8, 9 back to the cable drum 7. In the case of a motorized adjustment of the cable drum 7, the drive cable 6 moves over the two deflecting means 8, 9. The driver 4 is driven correspondingly by the fact that the driver 4 is fastened to the drive cable 6.

The drive cable 6 can be a metal wire cable, a plastic cable or the like. In particular in the case of the configuration of the drive cable 6 as a plastic cable, the above-described deflecting pins can advantageously be used.

Here, the displacement guide 5 has a guide profile 5a which is in positively locking engagement with the driver 4. This can be a dovetail guide or the like.

It is the case in the embodiment which is shown in FIGS. 2 to 4 and to this extent preferred that the drive cable 6 runs next to the displacement guide 5. In principle, however, there can also be provision for the drive cable 6 to run within the displacement guide 5, in particular in grooves which are provided specially for this purpose.

Furthermore, it can be gathered from the illustration in FIGS. 2 to 4 that the displacement guide 5 is of bent configuration, the bending axis being oriented in FIG. 4 perpendicularly with respect to the plane of the drawing. This will also be explained further below.

Figure 5:
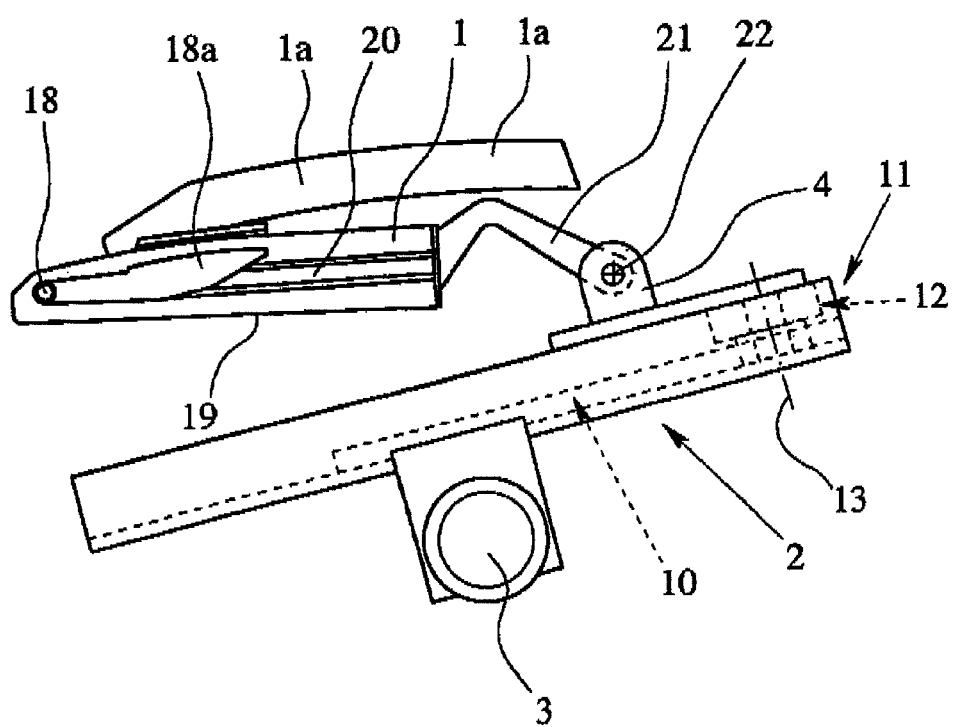
FIG. 5 shows a side view of a second embodiment of a display device according to the proposal in the parked position.
Figure 6:
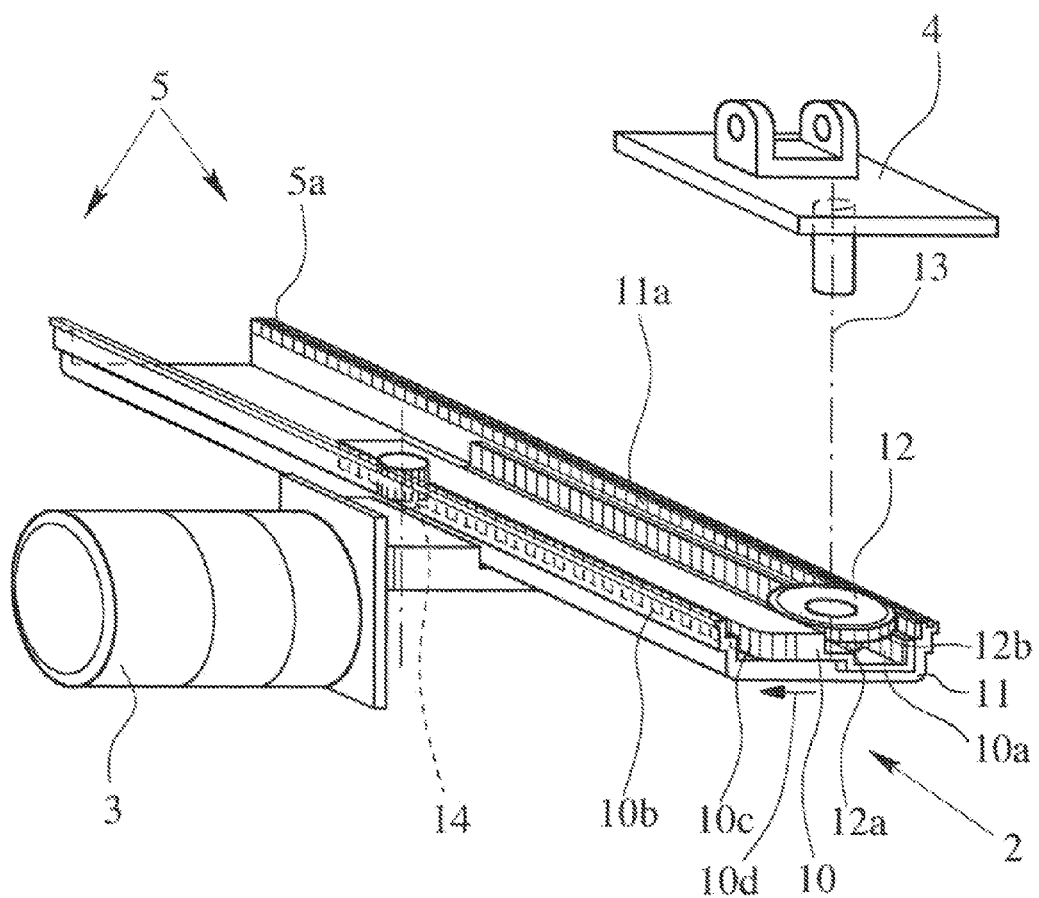
FIG. 6 shows a perspective illustration of the adjusting drive of the display device according to FIG. 5 in the partially dismantled state.

FIGS. 5 and 6 show a further preferred refinement of an adjusting drive 2, by way of which similar drive movements can be produced as by way of the adjusting drive 2 which is shown in FIGS. 2 to 4. This is a special form of a rack and pinion drive.

First of all, reference may be made to the fact that a rack and pinion drive of conventional design can also be used in the present case. Here, the drive motor 3 is equipped with a pinion which meshes with a rack arrangement. Here, the rack arrangement represents the driver 4 in the above sense. In principle, it is advantageous in a rack and pinion drive of this type that the displacement guide 5 is already an integral constituent part of the adjusting drive 2. A separate displacement guide 5, as is shown in the embodiment which is shown in FIGS. 2 to 4, does not have to be realized.

The above-described, conventional rack and pinion drive has the disadvantage that the required installation space in the direction of the drive movement is comparatively large.

FIGS. 5 and 6 show an optimized rack and pinion drive. There is provision here for the adjusting drive 2 to have a first rack arrangement 10 and, parallel thereto, a second rack arrangement 11. Furthermore, a running pinion 12 is provided which meshes with the toothing systems 10a, 11a of the two racks 10, 11 and which is coupled to the monitor 1 via a driver 4. It can be gathered from the illustration in FIG. 6 that the arrangement is provided in such a way that a displacement of the first rack arrangement 10 parallel to the second rack arrangement 11 brings about a displacement of the geometric rotational axis 13 of the running pinion 12 parallel to the racks 10, 11. The result is that this displacement of the first rack arrangement brings about a displacement of the monitor 1 via the driver 4.

It is the case here and preferably that the drive motor 3 is coupled in drive terms to the first rack arrangement 10 via a drive pinion 14, the second rack arrangement 11 being more preferably fixed. The coupling in drive terms of the drive pinion 14 to the first rack arrangement 10 is realized by the fact that the first rack arrangement 10 has an additional toothing system 10b which meshes with the drive pinion 14.

Here and preferably, the second rack arrangement 11 is configured with a substantially U-shaped cross section and receives the first rack arrangement 10 and the running pinion 12. The second rack arrangement 11 preferably has a guide profile 5a, with which the driver 4 is in positively locking engagement. As a result, the displacement guide 5 is realized in a simple way.

The refinement shown in FIGS. 5 and 6 of the rack and pinion drive achieves a situation where the first rack arrangement 10 to be adjusted does not protrude beyond the adjustment range of the driver 4 in any circumstances. This is achieved by the fact that the running pinion 12 has a first pinion section 12a which is assigned to the first rack arrangement 10, and by the fact that the running pinion 12 has a second pinion section 12b which is assigned to the second rack arrangement 11. It is the case here and preferably that the diameter of the first pinion section 12a is different than the diameter of the second pinion section 12b, more preferably that the diameter of the first pinion section 12a is smaller than the diameter of the second pinion section 12b, and finally, more preferably, that the diameter of the first pinion section 12a is half the diameter of the second pinion section 12b. In the case mentioned last, the length of the first rack arrangement 10 is approximately half the length of the second rack arrangement 11, with the result that the first rack arrangement 10 is always situated within the second rack arrangement 11.

Although it is the case in the embodiment which is shown in FIGS. 5 and 6 that the drive movement which is produced is a straight movement, it is also conceivable in principle to design the rack and pinion drive to be bent, with the result that a bent drive movement can be produced correspondingly.

The preferred embodiment which is shown in FIGS. 5 and 6 shows a further special feature, namely that the rack arrangements 10, 11 differ from the mutually parallel arrangement in a small adjustment range, preferably when the monitor 1 is situated in the functional position.

Here, at its one end, the additional toothing system 10b of the first rack arrangement 10 has a toothing section 10c which runs along a bent track.

During the adjustment of the monitor 1 into the functional position, the toothing system 10b of the first rack arrangement 10 runs along the pinion 14, parallel to the toothing system 11a of the second rack arrangement 11, until the toothing section 10c is reached. In this position, the running pinion 12 is already situated in the region of left-hand end (in FIG. 6) of the first rack arrangement 10. In the case of a further adjustment, a slotted guide (not shown) brings about a situation where the right-hand end (in FIG. 6) of the rack arrangement 10 is adjusted additionally in the direction of the arrow 10d, that is to say transversely with respect to the drive movement. The left-hand end (in FIG. 6) of the first rack arrangement 10 does not follow this transverse adjustment, with the result that the first rack arrangement 10 encloses an angle with the second rack arrangement 11.

Finally, the first rack arrangement 10 reaches a position, in which the pinion 14 lies at the end of the toothing system 10b and prevents a return of the monitor 1 in the direction of the parked position. This is a simple solution for fixing the monitor 1 in the functional position.

Figure 7:
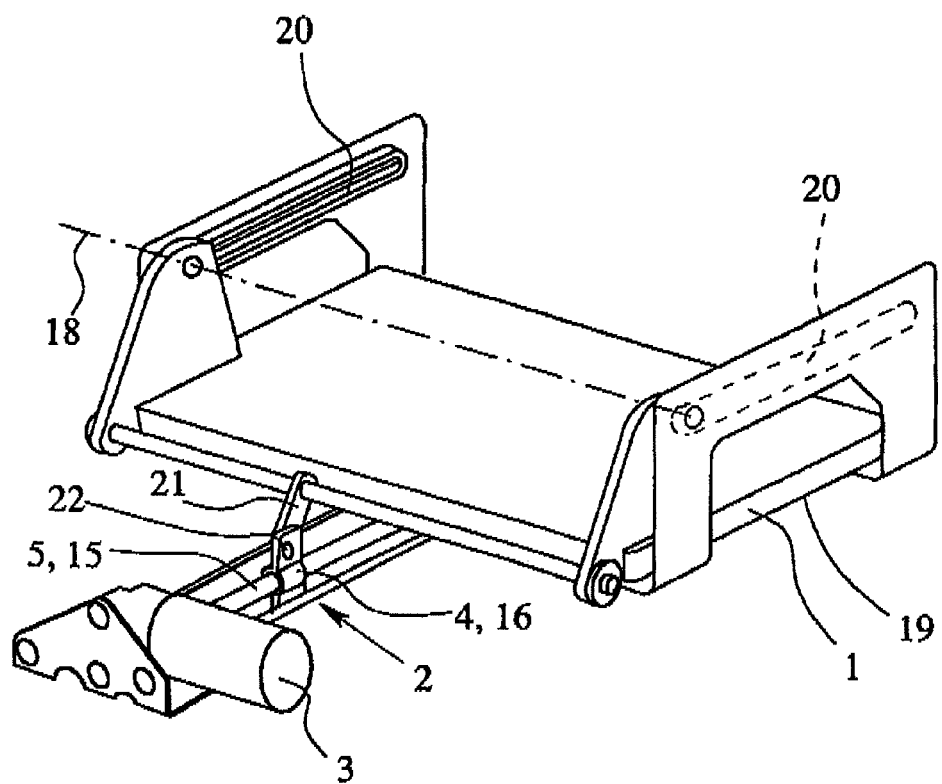
FIG. 7 shows a perspective view of a third embodiment of a display device according to the proposal in the parked position.
Figure 8:
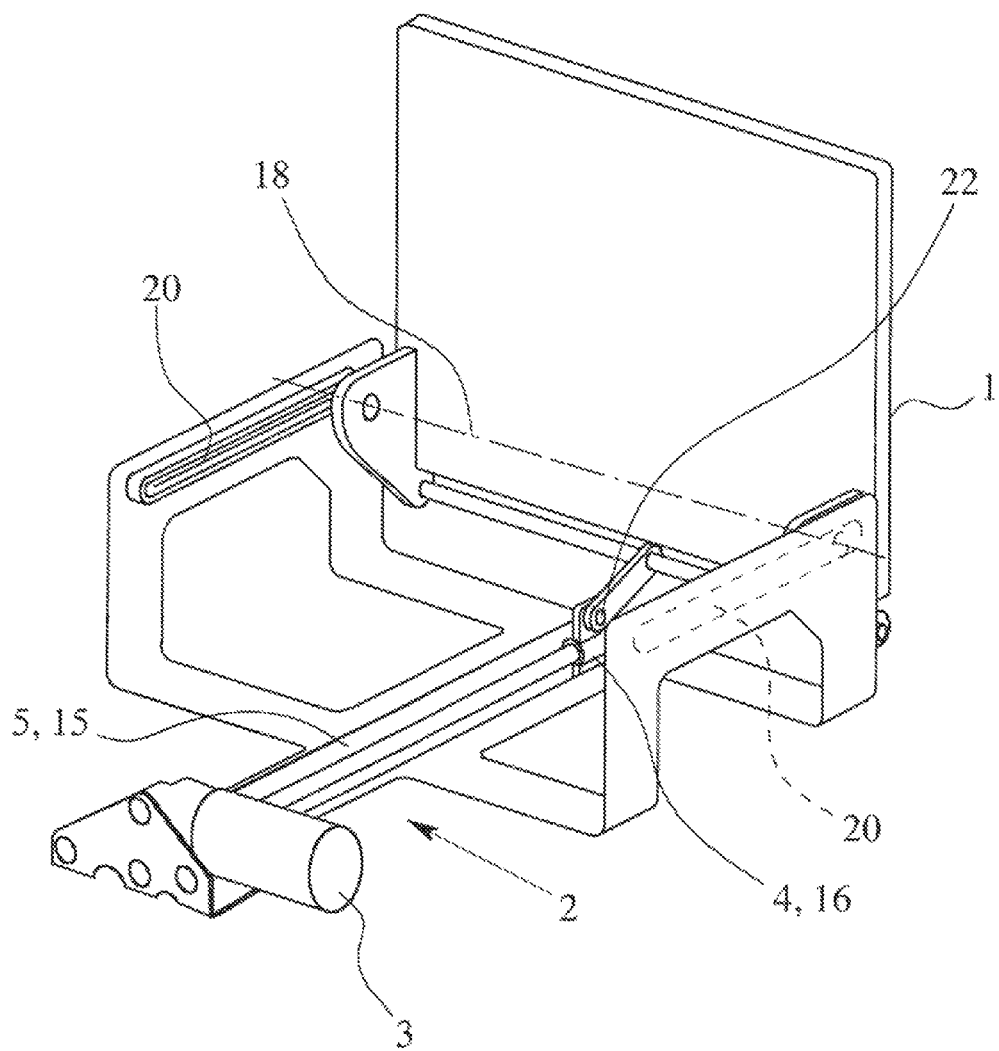
FIG. 8 shows the display device according to FIG. 7 in the functional position.

FIGS. 7 and 8 show one preferred embodiment, in which the adjusting drive 2 is configured as a spindle drive with a drive spindle 15 and a spindle nut 16. Here, the spindle nut 16 assumes the function of the driver 4 in the above sense and is correspondingly coupled in drive terms to the monitor 1.

It is the case here and preferably that the drive motor 3 is coupled to the drive spindle 15. In principle, however, there can also be provision for the drive motor 3 to be coupled in drive terms to the spindle nut 16.

The fact is particularly advantageous in the case of the adjusting drive 2 which is configured as a spindle drive, in a similar way to the rack and pinion drive, that the displacement guide 5 is provided by the spindle drive itself. It is the case here that the engagement between the drive spindle 15 and the spindle nut 16 provides the displacement guide 5.

With regard to the configuration of the adjusting drive 2, it can be summarized that, in all the embodiments shown, the adjusting drive 2 and the displacement guide 5 form one structural unit which can be preassembled and, as such a unit, can incidentally be coupled to the adjusting kinematic means during final assembly.

In the embodiment which is shown in FIGS. 2 to 4, the entire adjusting drive 2 including the displacement guide 5 is arranged on a drive carrier 17 and can be assembled and dismantled as one structural unit by means of the drive carrier 17.

In the embodiment which is shown in FIGS. 5 and 6, the entire adjusting drive 2 including the displacement guide 5 is arranged on or in the second rack arrangement 11. Accordingly, the entire adjusting drive 2 including the displacement guide 5 can be assembled or dismantled as one structural unit via the second rack arrangement 11.

In the embodiment which is shown in FIGS. 7 and 8, the entire spindle drive can be preassembled, since the drive motor 3, both spindle bearings (not shown) and the spindle nut 16 are arranged on the drive spindle 15.

Furthermore, with regard to the configuration of the adjusting drive 2, it can be summarized that the adjusting drive 2 is configured substantially as a linear drive in all the embodiments shown, the drive movement which is produced being slightly bent in the embodiment which is shown in FIGS. 2 to 4. The expression "linear drive" is to be understood to be correspondingly broad.

Furthermore, with regard to the configuration of the adjusting drive 2, reference may also be made to the fact that an intermediate gear mechanism can also be connected between the drive motor 3 and the respectively driven drive component (cable drum 7, rack arrangement 10, drive spindle 15). This intermediate gear mechanism can be, for example, a spur gear mechanism, a bevel gear mechanism or a planetary gear mechanism.

Finally, with regard to the configuration of the adjusting drive 2, reference may also be made to the fact that the adjusting drive 2 is preferably not of self-locking configuration. This has the advantage that the monitor 1 can also be adjusted manually, at least in the direction of the parked position. In principle, it is conceivable here that a manual adjustment of this type of the monitor 1 is detected using control technology and is transferred into a motorized adjustment of the monitor 1 into the parked position. In the case of a configuration of this type of the adjusting drive which is not self locking, it is advantageous if the friction which acts within the drive train is great enough to hold the monitor 1 in every position, in particular in the functional position.

In all the embodiments which are shown, the adjusting kinematic means is equipped in each case with a mounting means for the monitor 1, the respective mounting means being of similar configuration in principle.

It is preferably the case here that the monitor 1 can be pivoted about a pivot axis 18 which can preferably be displaced in parallel, the pivot axis 18 being oriented more preferably parallel to the display face 19 of the monitor 1. In the embodiment which is shown in FIGS. 2 to 4, the pivot axis 18 of the monitor 1 is fixed on a pivot axis carrier 18*a*. Here, the monitor 1 can move past the pivot axis 18 as it were, by means of a slotted guide 20. This results from a combination of FIGS. 2 to 4. The same type of mounting means is shown in the embodiment which is shown in FIGS. 5 and 6.

The situation is somewhat different in the embodiment which is shown in FIGS. 7 and 8. Here, the pivot axis 18 is connected rigidly to the monitor 1 and can be displaced in a slotted guide 20. This means that the pivot axis 18 is also displaced when running through the slotted guide 20 in the embodiment which is shown in FIGS. 7 and 8.

It is the case in all the embodiments shown that an adjustment of the driver 4 brings it about that the pivot axis 18 runs through the slotted guide 20. As a result, the monitor 1 is displaced and is pivoted at the same time or only after it runs onto a stop or the like.

The combination of the pivotability of the monitor 1 about the pivot axis 18 with the substantially linear drive movement of the adjusting drive 2 can preferably be realized by the fact that the monitor 1 can be coupled pivotably to the driver 4, here and preferably via a drive lever 21.

In the context of an optimum transmission of the adjusting drive 2, there is preferably provision for the displacement guide 5 to be oriented perpendicularly with respect to the pivot axis 18 of the monitor 1. Furthermore, it is preferably the case that the adjusting drive 2, in particular the driver 4, is arranged substantially centrally, as viewed over the width of the monitor 1.

In order to realize the automatic pivoting of the monitor 1 in a simple way, there is preferably provision, furthermore, for the adjusting drive 2 to be coupled to the monitor 1 in such a way that the force action line of the drive force of the adjusting drive 2 is spaced apart from the pivot axis 18 of the monitor 1, at least in the functional position. This is the case in all the embodiments shown.

Reference has already been made to the fact that the drive movement which is produced by the adjusting drive 2 can be straight or bent. It is the case in detail that, during the adjustment of the monitor 1, the coupling point 22 between the driver 4 and the monitor 1 or the drive lever 21 which is coupled to the monitor 1 moves along a drive track which can have a straight course, as is the case in the embodiments which are shown in FIGS. 5 and 6 and in FIGS. 7 and 8.

In principle, however, it is also conceivable that this drive track has a curved course and that the axis of curvature is preferably oriented parallel to the pivot axis 18 of the monitor 1. This is not necessarily a circular drive track. The above specification of the axis of curvature serves only the purpose of defining the rough direction of the curvature.

Whereas the orientation of the monitor 1 in the functional position is fixed substantially by the fact that the desired information should be satisfactorily legible by the vehicle occupants, there is a series of options for the positioning of the monitor 1 in the parked position. There is provision in one particularly preferred refinement for the monitor 1 to be situated in the parked position in a lying position, in which the monitor 1 is oriented substantially horizontally. This specification relates to the display device in the installed state.

Finally, reference may also be made to the fact that, according to its design, the adjusting drive 2 is preferably a window lifter drive. The compactness of window lifter drives of this type represents a very special advantage for the present application.

The second, third and fourth teachings of the invention which are to be attributed in each case independent significance relate to a display device having an adjusting drive 2 which is configured as a cable drive, as a two stage rack and pinion drive and as a spindle drive, the issue in each case not necessarily being the above-described realization of one structural unit which can be preassembled. Reference may be made to the fact that all the described variants and advantages can be applied per se or in combination to all three further independent teachings.

According to a further teaching which is likewise attributed independent significance, an adjusting drive system is claimed which has an adjusting drive 2 for adjusting the monitor 1 of a display device in a motor vehicle. In one preferred refinement, in addition to the adjusting drive 2, this adjusting drive system also comprises the displacement guide 5. All the above mentioned variants can likewise be applied in their full scope, in each case per se or in combination, to the adjusting drive system

The invention claimed is:

1. A display device in a motor vehicle having an adjustable monitor comprising a display face and an adjusting kinematic means which is assigned to the monitor, the adjusting kinematic means having an adjusting drive with a drive motor for the monitor, it being possible for the monitor to be adjusted by means of the adjusting drive between a parked position and a functional position, wherein the monitor can be pivoted about a pivot axis which can be displaced in parallel, the adjusting drive having a driver and being coupled in drive terms to the monitor via the driver, and a displacement guide being provided and the driver being guided by means of the displacement guide, wherein the adjusting drive, including the displacement guide, is arranged on a drive carrier that can be assembled and dismantled as one structural unit by means of the drive carrier, wherein the driver is configured as a slide, and the displacement guide has a curved course, that, during the adjustment of the monitor, the coupling point between the driver and the monitor moves along a drive track, that has a curved course, wherein the axis of curvature is oriented parallel to the pivot axis of the monitor, and the adjusting drive is configured as a cable drive with a drive cable, and the drive cable is coupled in drive terms to the monitor via the driver, wherein in an installed state of the display device, the monitor is situated in the parked position in a lying position, with the display face facing down, in which the monitor is oriented substantially horizontally, wherein a monitor cover is provided for and wherein the adjusting kinematic means is provided in such a way that the monitor can be displaced and at the same time can be pivoted such that during the adjustment from the parked position into the functional position the monitor moves outward under the monitor cover.

2. The display device as claimed in claim 1, wherein the drive cable runs within the displacement guide in grooves which are provided specially for this purpose.

3. The display device as claimed in claim 1, wherein the adjusting drive and the displacement guide together form one structural unit which can be preassembled and, as such a unit, can incidentally be coupled to the adjusting kinematic means during final assembly.

4. The display device as claimed in claim 1, wherein the drive motor is coupled in drive terms to the drive cable via a cable drum.

5. The display device as claimed in claim 1, wherein the adjusting drive has two deflecting means which are spaced apart from one another selected from deflecting rollers, deflecting pins, or a combination thereof and wherein the drive cable is guided from the cable drum via the two deflecting means back to the cable drum.

6. The display device as claimed in claim 1, wherein the pivot axis is oriented parallel to the display face of the monitor.

7. The display device as claimed in claim 1, wherein the monitor is coupled pivotally to the driver, preferably via an output lever.

8. The display device as claimed in claim 1, wherein the displacement guide is oriented perpendicularly with respect to the pivot axis of the monitor.

9. The display device as claimed in claim 1, wherein the adjusting drive is coupled to the monitor wherein, at least in the functional position, the force action line of the drive force of the adjusting drive is spaced apart from the pivot axis of the monitor.

10. The display device as claimed in claim 1, wherein, in the parked position, the monitor is situated in a lying position, in which the monitor is oriented substantially horizontally.

11. The display device as claimed in claim 1, wherein the adjusting drive is a window lifter drive.

* * * * *